(12) United States Patent
Plotkin et al.

(10) Patent No.: US 6,222,663 B1
(45) Date of Patent: Apr. 24, 2001

(54) HIGH DUTY CYCLE SCANNER FOR LASER PRINTER

(75) Inventors: Michael Plotkin, Rehovot; Haim Livne, Kfar-Sava; Gideon Amir, Gan-Vavne; Craig Breen, Nes-Ziona; Itzhak Malobani, Mazkeret-Batya, all of (IL)

(73) Assignee: Indigo N.V., Maastricht (NL)

( * ) Notice: Subject to any disclaimer, the term of this patent is extended or adjusted under 35 U.S.C. 154(b) by 0 days.

(21) Appl. No.: 09/393,681

(22) Filed: Sep. 10, 1999

Related U.S. Application Data

(63) Continuation of application No. PCT/IL97/00126, filed on Apr. 17, 1997.

(51) Int. Cl.[7] .................................................. G02B 26/08
(52) U.S. Cl. .................... 359/216; 359/204; 359/197; 359/201; 359/203; 359/241; 347/241
(58) Field of Search .................... 359/204, 216–219, 359/196, 197, 201, 203; 347/241, 243, 256, 259–261

(56) References Cited

U.S. PATENT DOCUMENTS

| | | |
|---|---|---|
| 3,646,568 | 2/1972 | Woywood . |
| 4,057,784 | 11/1977 | Tafoya . |
| 4,445,126 | 4/1984 | Tsukada . |
| 4,525,024 | 6/1985 | Tatsuno et al. . |
| 4,763,192 | 8/1988 | Moore et al. . |
| 5,198,919 | 3/1993 | Reeder . |
| 5,251,055 | * 10/1993 | Koide .................................. 359/216 |
| 5,291,223 | 3/1994 | Atsushi et al. . |

FOREIGN PATENT DOCUMENTS

| | | |
|---|---|---|
| 0 079 532 | 5/1983 | (EP) . |
| 0 575 988 | 12/1993 | (EP) . |
| 0 729 265 | 8/1996 | (EP) . |
| 60-098418 | 1/1985 | (JP) . |
| 62-090615 | 4/1987 | (JP) . |
| 5-088099 | 4/1993 | (JP) . |
| 7-092408 | 4/1995 | (JP) . |
| 8-234124 | 9/1996 | (JP) . |
| 9-043524 | 2/1997 | (JP) . |

* cited by examiner

*Primary Examiner*—Darren Schuberg
*Assistant Examiner*—Fayez Assaf
(74) *Attorney, Agent, or Firm*—Fenster & Company Patent Attorneys, Ltd.

(57) ABSTRACT

A scanner for scanning a beam across a surface, such as a photosensitive surface or a document, the scanner comprising:
- a plurality of multi-faceted polygon disks, mounted for common rotation on an axis;
- a plurality of data modulated beams, wherein one of said beams is configured to impinge on the facets of one of the disks and be reflected therefrom toward the surface.

27 Claims, 4 Drawing Sheets

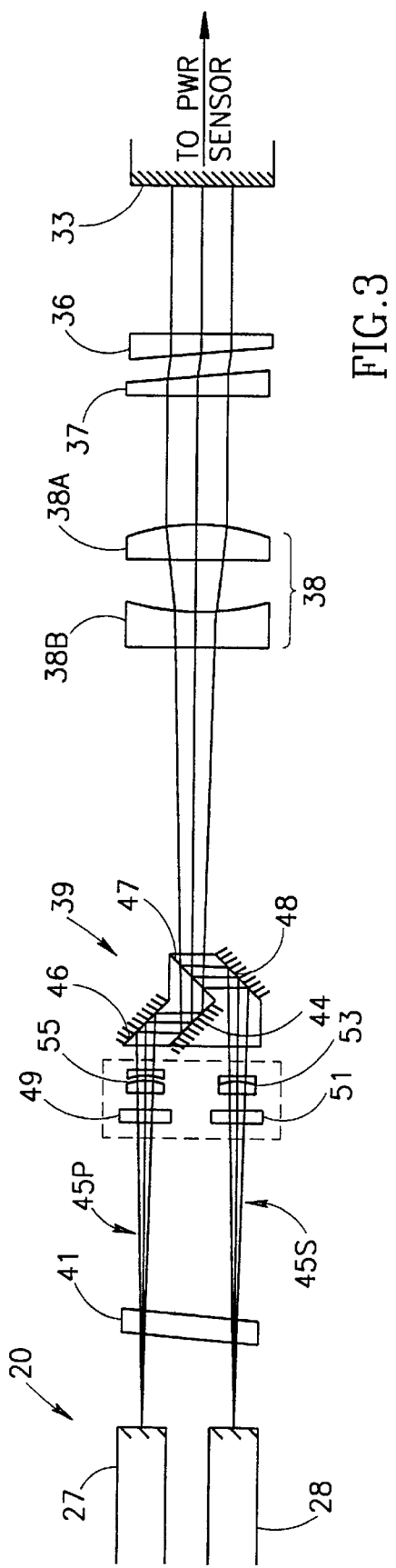
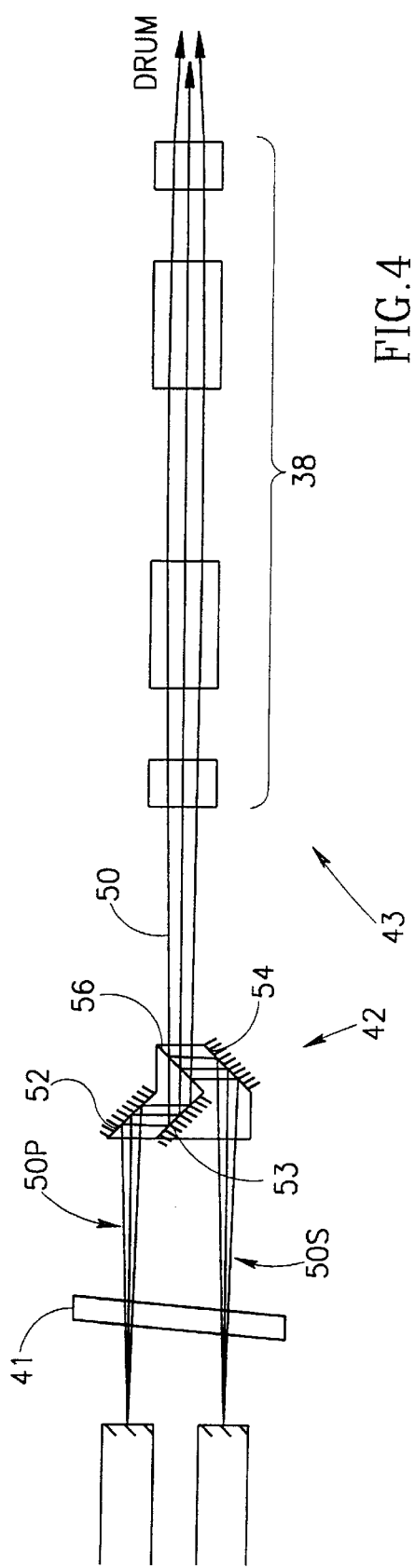
FIG.3
FIG.4

HIGH DUTY CYCLE SCANNER FOR LASER PRINTER

RELATED APPLICATIONS

The present application is a continuation of PCT application number PCT/IL97/00126, filed Apr. 17, 1997.

FIELD OF THE INVENTION

The present invention relates to scanning operations used for high speed printing in which images based on text, image or graphics data or a combination of them are transferred to paper. More particularly, this invention is concerned with scanners used for high speed, high resolution, electronic printers. Such scanners generally use a polygon disk with multiple facets that are partially illuminated by a single or multi-beam light source.

BACKGROUND OF THE INVENTION

In recent years, high speed electronic printing has improved both in quality and in the speed with which the printing is accomplished. However, those skilled in this particular art are continuously searching for ways to further increase the speed of the printers. The faster the printer can operate, the more marketable it is.

Higher speeds must not adversely effect the resolution, contrast and overall quality of the printed material. Presently available printers often use scanners comprising a rotating polygon disk with partially illuminated facets to direct light at a drum having a photo sensitive layer for transferring data to be printed. While single beam scanners are used for slow speed printing, for high speed printing, a multiple beam light source is generally used. However, the duty cycle of the polygon facets in the presently available scanners operating in an under scanned mode is about 50% as a result of a minimum beam size constraint imposed by optical resolution requirements and limitations on the polygon diameter due to its high rotational speed.

In the past those skilled in the art have attempted to increase the speed of the scanner, thereby increasing the speed at which the printers operate by increasing either the rotational speed of the polygon disk, by increasing the number of polygon facets, or by increasing the number of light beams from the source. It has been found that the possibility of increasing each of these parameters is technologically limited or highly expensive. For example, increasing the speed of rotation of the scanners has been frustrated by inertial facet deformation and air friction forces. The same frustration was met in attempting to increase the number of polygon facets. As the number of light beam sources is increased, optical aberrations caused by off-axis light sources cause innumerable problems. Thus, in the art as known, attempts at increasing the speed of the scanning process may have reached a limit.

SUMMARY OF THE INVENTION

The present invention seeks to increase the speed of operation of printers which utilize polygon scanners by increasing the scanning capability of the scanners by about a factor of two. The present invention accomplishes this increase in capacity by increasing the duty cycle of the polygon by almost a factor of two. This increase in duty cycle is accomplished, in a preferred embodiment of the invention, by providing an improved polygon scanner that uses a plurality of rotating multi-faceted polygon disks, rather than a single disk. Preferably each of the disks has the same number of facets and all of the disks are mounted on the same axis. Furthermore the disks preferably rotate together about the axis.

In a preferred embodiment of the invention the facets of the two stacked polygon disks are mounted out of phase, i.e. the facets of one polygon is rotated by one-half a facet angle with respect to the other polygon.

Data modulated beams of energy such as light waves are directed at the facets and reflected therefor to scan across a photosensitive surface of a rotating drum or a belt.

In a preferred embodiment of the invention, a first beam or group of beams is directed toward one of the disks and a second beam or group of beams is directed toward the other disk. The beams which are reflected from the facets enter on a combiner in which both sets of beams are made to sweep (scan) the same line (or lines, for multibeam scanners). In order to avoid confusion, when the term "beam" is used herein, the term includes a group of multiple beams which are swept together.

Since the beams reflected from the two polygons are "out of phase," one or the other of the beams, but generally not both, sweeps the line at any one time. Since the duty cycle of each of the beams is the same as in a polygon scanner of the prior art, utilizing two beams doubles the sweep duty cycle of the system.

In a preferred embodiment of the invention a first optical system splits a data modulated beam or beams into two sets of beams and directs the sets of beams to available facets of each of said plurality of disks. A second optical system recombines the beam components and directs the reconstructed beam onto the photo-sensitive surfaces of the drum or other photosensitive surfaces causing an image based on the data to be provided on the photosensitive surface.

More particularly, an improvement of preferred embodiments of the uses a uni-axis double disk arrangement polygon with the scanning operation performed by interlacing the beam components between an upper and a lower polygon disk. The two identical polygon disks are mounted having an angular shift (where two disks are used) of $\Delta\phi = 180°/N$ (wherein N is the number of facets) on the same motor shaft so that the useful parts of the scanning cycle are alternated between the two disks. Accordingly, since the useful duty cycle for each disk is 50% or less, there is no time overlap while scanning with the two disks; synergistically the same multi-source beam and rotational drive system is used for scanning with both disks.

A first beam splitter is preferably used to illuminate the upper polygon disk and the lower polygon disk from one or preferably a plurality of light sources. A second beam splitter is provided between the polygon and an F-Theta lens system, as known in the art, for directing the reflected data modulated beams to the optical symmetry plane of the F-Theta lens. The addition of the second beam splitter between the scanner and the F-Theta lens avoids off-axis operation of the F-Theta lens and improves the resultant image quality. The beam splitters are preferably designed so that the upper and lower channels are optically identical so that the interlaced scanning lines and focal spots are identical.

The preferred method and apparatus as described above are based on utilizing almost the entire polygon disk duty cycle by interlacing between two uni-axis polygon disks.

It should be understood that the upper and lower scanned beams alternatively sweep the moving drum or belt allowing for twice the scanning speed for the same number of parallel scanned beams.

A preferred embodiment the invention uses polarizing beam splitters for dividing an incoming beam into upper and lower channels which are P- polarized and S-polarized. The beam or beams, prior to the scanner, is preferably provided with a circular polarization or a linear polarization having equal P and S components.

In addition, it is within in the scope of the present invention to utilize methods of splitting the beam other than using polarizing beam splitters. For example, wave length selected beam splitting can be accomplished, as well many other well-known methods of optically filtering. In certain of the preferred embodiments of the invention, semi-transparent mirrors can be used, with generally decreased efficiency.

In an alternative preferred embodiment of the invention, the (two) polygon disks can be illuminated by separately generated beams rather than by single beam which is split.

While the present invention is described in the context of scanning a photoreceptor drum of a printer or the like, the scanned surface may be any surface which reacts to light, referred to herein as a photosensitive surface. Additionally, the present invention is also applicable to a document scanner. In this application, the system sweeps a surface to be read and the reflection from that surface is read by a photo-detector. In this case the beams are not data modulated, however, the light reflected from the document being scanned is modulated.

There is thus provided, in accordance with a preferred embodiment of the invention, a scanner for scanning a beam across a surface comprising:

a plurality of multi-faceted polygon disks, mounted for common rotation on an axis;

a plurality of beams, wherein each of said beams is configured to impinge on the facets of one of the disks and be reflected therefrom toward the surface.

In a preferred embodiment of the invention, the multi-faceted disks are mounted such that the facets of the disks are mounted with an angular shift between them. Preferably, the angular shift is equal to 180°/N, wherein N is the number of facets on the polygon disk.

In a preferred embodiment of the invention, the scanner includes a combiner which receives the beams reflected from the plurality of disks and redirects them such that they sweep substantially the same line. Preferably, the reflected beams are polarized beams and wherein the combiner comprises an inverted polarizing beam splitter.

In one preferred embodiment of the invention, the combiner receives a beam and splits it to produce said plurality of data modulated beams.

In an alternative preferred embodiment of the invention, the scanner includes a beam splitter which receives a beam and splits it to produce said plurality of beams. Preferably, the beam splitter is a polarizing beam splitter, such that the plurality of beams have different polarizations.

In a preferred embodiment of the invention, the plurality of multi-faceted polygons consists of two such polygons.

In a preferred embodiment of the invention a plurality of beams impinges each of said polygons. Preferably, the plurality of beams impinging on each of said polygons are arranged to sweep parallel lines on said surface.

In a preferred embodiment of the invention, the beams reflected from the plurality of beam polygon disks sequentially scan the surface.

The utilization of more than one beam or group of beams to sweep the surface in a sequential manner allows for efficient use of polygon scanners having somewhat lower scanning duty cycles (for the individual facets) than normal. Thus, while 45% or so is a usual value for a conventional single under-scanned disk system, giving a 90% overall scanning duty cycle, lower values of duty cycle for a single disk can be utilized (with simplification of the design of the system optics) while keeping the overall system duty cycle high. For example if the optics is designed for a 35% duty cycle per facet, an overall duty cycle of 70% can be achieved.

While such high duty cycles can be achieved by utilizing large polygons or overfilled polygons, such solutions result in problems in optical image quality and uniformity or slow scanning speed due to mechanical limitations.

There is further provided, in accordance with a preferred embodiment of the invention, a scanner for scanning a surface in a scan direction comprising:

a plurality of beams which sequentially sweep spaced apart lines; and a combiner which combines the beams such that they sequentially sweep the same line.

Preferably, the beams are polarized with different polarities and wherein the combiner is polarizing combiner. Preferably, the combiner is an inverted polarizing beam splitter.

Preferably, the surface is a photosensitive surface.

Preferably, the beams are data modulated beams.

In an alternative preferred embodiment of the invention, the surface is a document to be scanned. Preferably, the beam is then unmodulated.

In a preferred embodiment of the invention, the scanner includes optics operative to provide differential focusing, more preferably adjustable differential focusing, of the beams in the scan direction.

In a preferred embodiment of the invention, the scanner includes optics, operative to provide differential offset, preferably differential offset, of the beams in the cross-scan direction.

There is further provided, in accordance with a preferred embodiment of the invention a method of scanning a surface comprising:

providing a plurality of beams which sequentially sweep spaced apart lines; and combining the beams such that they sequentially sweep the same line.

BRIEF DESCRIPTION OF THE DRAWINGS

Other features and advantages of the present invention will become apparent from the following description and claims taken in conjunction with the accompanying drawings, in which:

FIG. 3 is a more detailed showing of the multiple disk scanner and the optical system associated therewith for receiving modulated beams;

FIG. 4 is a more detailed showing of the multiple disk scanner and optical system used for reflecting the modulated beams towards the drum;

DESCRIPTION OF THE PREFERRED EMBODIMENT

Figure 1:
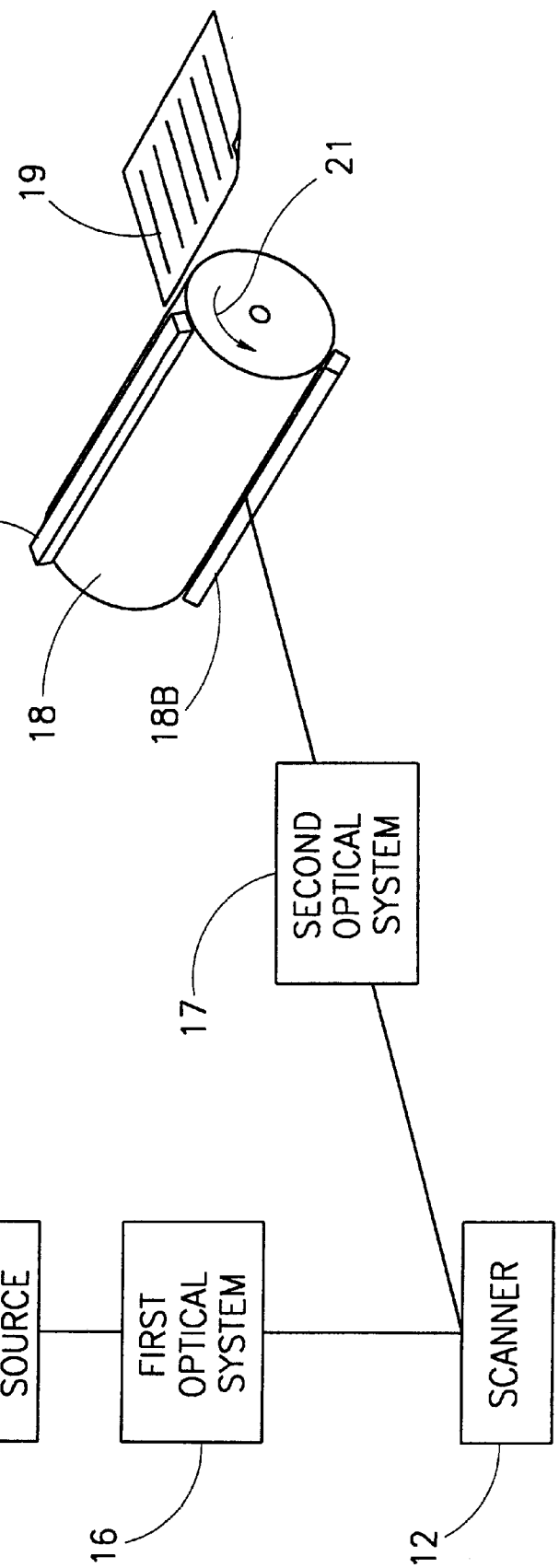
FIG. 1 is a generalized block diagram showing of a scanner used in a high speed electronic printing system.

The following description of a preferred embodiment is exemplary in nature and is in no way intended to limit the invention or its application or uses. FIG. 1 shows a typical high speed, high resolution electronic printer system 11 with a polygon scanner 12. System 11 includes a data matrix 13 which is used to modulate the beams of a multiple beam source 14, such as an individually addressable monolithic LD array or a fiber optic array coupled to individual laser diodes. The modulated beams are sent through an incoming optical system 16, to scanner 12.

The beams reflected from the scanner go through an outgoing optical systems 17 to a drum 18 having a photo-sensitive surface. Also shown is a printed document 19 which is the output of a printing system of which drum 18 forms a part. The drum is shown rotating in the direction of the arrow 21. Data from data matrix 13 is used to modulate the beams through the use of modulator 15 as is well known in the art. It should be understood that while the modulator is shown between the data and the beam source, the data could be used to modulate the beam at any position prior to the first or input optical system 16. Although a single beam is shown in FIG. 1, beam source 14 may generate a number of beams which sweep parallel scan lines as the beams sweep across drum 18. The invention includes and is equally applicable to both single and multiple beam systems.

Figure 2:
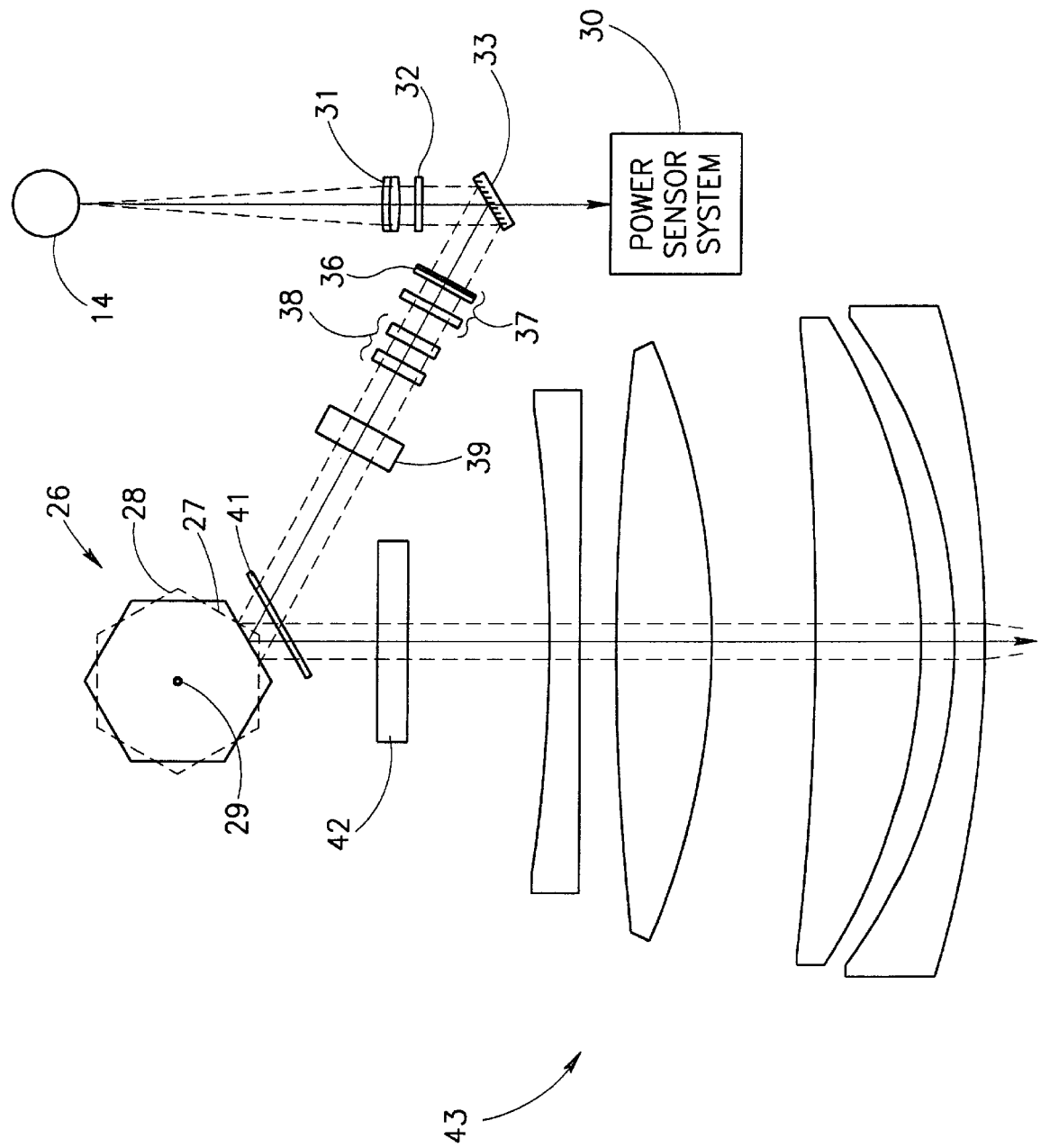
FIG. 2 is a block diagram showing the inventive scanner and the basic optical systems used in the printing system.

FIG. 2 shows details of printer 11, including a double disk polygon scanner 26 having an upper disk 27 and a lower disk 28. Both disks are shown as mounted on and rotating in the same sense on the same axis 29. Preferably disks 27 and 28 have the same physical size and the same number of facets. Disks 27, 28 are also rotated simultaneously about axis 29, for example by a motor, not shown. In FIG. 2 modulation apparatus is not shown and it is assumed that multiple-beam source 14 transmits modulated beams. Modulated beams are transmitted through a collimator 31 which acts to minimize beams divergence. The beams are then preferably sent through a quarter wave length plate 32 which is set up to convert the incoming beam to circular polarization. Plate 32 is used for providing a polarization of the beam which will allow for efficient splitting of the beam, such a circularly polarized beam. While other solutions which will yield P and S polarized waves are also possible, the use of a quarter wave plate to produce circular polarization results in a system which easily compensates for polarization angle of the laser source by a simple rotation of the plate. The polarized modulated beam is next transmitted to a mirror 33, used to minimize the size of the system by "folding" the beams. Mirror 33 is partially transparent so that some of the beams pass through the mirror and are used by a power sensor system 34 to control the intensity of the beams generated by the multi-beam source.

The beams reflected from the mirror are sent through a pair of prisms 36 and 37. One of the prisms is dynamic and the other is static. The purpose of the dynamic prism is to correct for small positioning errors in the process direction (i.e., the cross scan direction) as they occur in the system, during operation, while the static prism corrects for aberrations caused by the dynamic prism. Preferably, the system contains a system for sensing the positioning errors and means for moving the prism to correct the error. From prism 37 the beams are transmitted through a cylindrical lens 38. The purpose of the cylindrical lens is to minimize the effect of the polygon facets pyramidal effect.

From cylindrical lens 38, the polarized modulated beams are sent through a first beam splitter indicated at 39. Beam splitter 39 is used to obtain two generally parallel outgoing beams for each incoming beam; one beam is transmitted to upper disk 27 while the other beam is transmitted to lower disk 28. Both are transmitted through a polygon window 41 which is used to keep the polygon clean and, in the case of high speed system to provide a means for allowing the polygon to rotate in an evacuated area to reduce windage.

To scan the beams across the face of the drum, the upper and lower (scanned) beams reflected from the scanner 26 are transmitted through polygon window 41 and a second polarizing beam splitter 42 which acts as a combiner.

Each of the beam splitters can use any known method for splitting and/or recombining the beams. However, the preferred embodiment utilizes polarized beam splitters, that is, the splitter produces two beams having crossed polarization, in the present case designated as S and P polarizations.

The differently polarized beams are then sent to the dual disk polygon, one beam being sent to the upper disk and one beam being sent to the lower disk. Subsequently, polarizing beam splitter 42 is used to recombine the beams. In the preferred embodiment, beam combiner 42 also utilizes the polarization of the beams in its operation. By using a polarizing beam splitter and a polarizing beam combiner losses are kept to a minimum.

Following beam combiner 42 the beams enter a lens arrangement or optical system 43 of a conventional type generally including an F-Theta lens arrangement. The output of the lens arrangement 43 scans across the drum on a line by line basis, generally several lines at a time for multi-beam systems. In preferred embodiments of the invention, a beam or group of beams reflected from one polygon first sweeps the drum. As it ends its sweep of the drum, a beam or beams reflected from the other polygon then begins to sweep the drum. Between sweeps, the drum has rotated and the surface has moved, so that the beams sweep different portions of the drum surface.

FIG. 3 shows details of the travels of the beam (or plurality of beams) from folding mirror 33 to polygon scanner 20 comprised of the plurality of disks 27, 28. The beams from mirror 33 are shown as first going through static prism 36 and then through dynamic prism 37. From the prisms the beams are transmitted to cylindrical lens 38 shown as being comprised of a plano-convex lens 38A and a plano-concave lens 38B.

In the preferred embodiment shown in FIG. 3 a polarizing beam splitter 39 splits the beam into a P polarized beam and an S polarized beam. The P polarized beam is shown as passing through polarizer 47, then being reflected from surfaces 44 and 46 of beam splitter 39 and exiting beam splitter 39 at the level of upper polygon disk 27. The S polarized beam, on the other hand, is reflected by polarizer 47 back towards surface 48 from which it is reflected towards and on the level with the lower disk 28 of the dual disk scanner 26.

Preferably, vertical shift compensators 49 and 51 and a scan-direction differential focus compensator comprised of two lens sets 53 and 55 are placed between first beam splitter 39 and scanner 26. The two types of compensators provide fine adjustments to assure that the P polarized beam 45P and the S polarized beam 45S form identically focused scanning lines on the drum without any differential shift in the cross-scan (process) direction. Lens sets 55 and 53 each comprise a matched set of plano-convex and plano-concave lenses. When the spacing between the lenses is zero (i.e., when the lenses touch) the lens set has no effect. When the two lenses are separated, the set has a focusing effect in the cross-scan direction. If only one of sets 53 and 55 has a gap, or if the gaps for the two sets are different, cross-scan focus differences between the two beams can be compensated. It should be noted that neither the vertical shift compensator nor the differential focusing compensator are shown in FIG. 2. However, they are both present in preferred embodiments of the invention.

FIG. 4 shows the path of the split beam after reflection from disks 27 and 28 of scanner 26. The split beam passes through the polygon window 41 and is directed to the second polarizing beam splitter prism 42, which acts as a beam combiner. As shown, the P beam, 50P, is reflected from surface 52 and then from surface 53 to pass through polarizer 56 and out of the beam combiner along combined beam line 50. Beam 50P beam is combined in the beam combiner with beam 50S which strikes surface 54, is reflected from surface 54 and from polarizer 56 to be combined with the reflection of beam 50P from surface 53 to form the combined beam 50. The F-Theta lens arrangement 43 is again shown directing the beams 50 toward the photo-sensitive surface of drum (or belt) 18.

Figure 5:
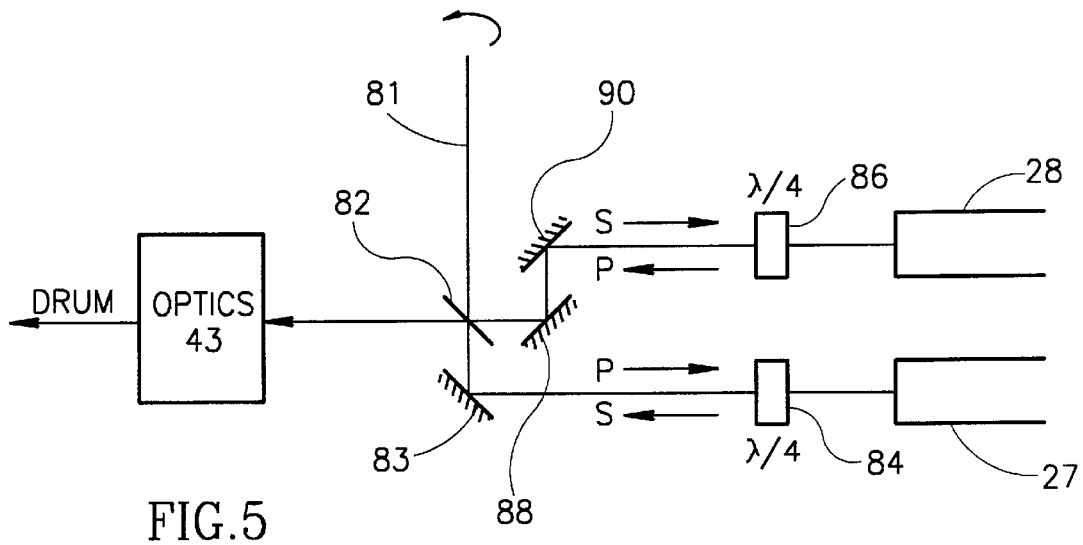
FIG. 5 is a schematic illustration of a portion of a scanner in accordance with a preferred embodiment of the invention.

In the embodiment of FIG. 5, a polarized beam 81 (most preferably a circularly polarized beam or optionally linearly polarized and containing equal P and S components) is directed to an S reflecting mirror 82. The P beam passes through mirror 82 and reflected from a mirror 83. The P beam reflected from mirror 83 passes through a λ/4 plate 84 and strikes disk 27. It is reflected from disk 27 and again passes through λ/4 plate 84. The passages through the plate 84 (together with the reflection) transforms the P polarized beam to an S polarized beam. The S polarized beam strikes the S reflecting mirror 82 and is directed to the drum 18 through the optics 43.

The S polarized beam originally reflected from mirror 82 is sequentially reflected from two mirrors 88 and 90 and then through a λ/4 plate 86 to disk 28. It is reflected from the disks and again passes through λ/4 plate 86 to be transformed to a P polarized beam. The P polarized beam (after reflection by mirrors 90 and 88) passes through S reflecting mirror 82 and is combined with the S polarized beam which was reflected from mirror 83. The combined beam passes optics 43 such F-Theta leans system 43 to scan the drum 18.

Figure 6:
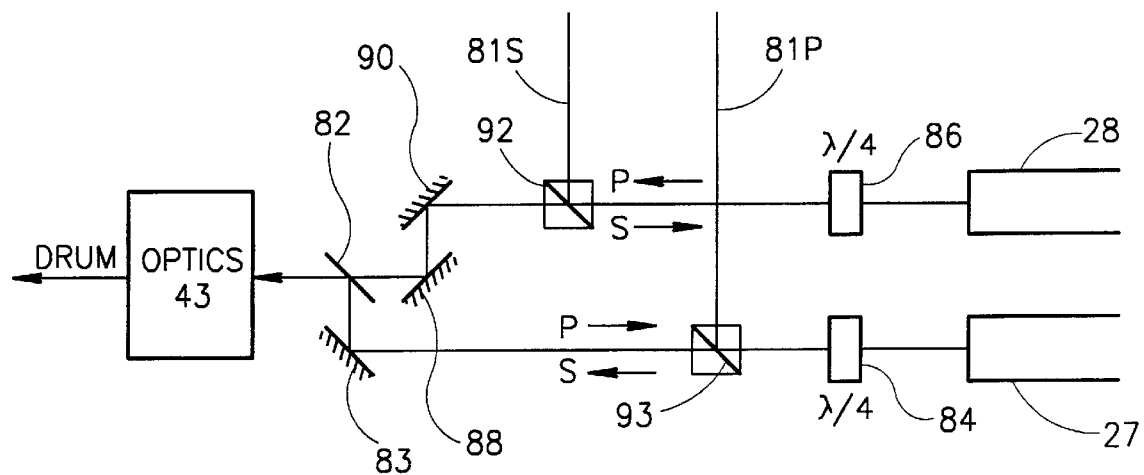
FIG. 6 is a schematic illustration of a portion of a scanner according to a further embodiment of the invention.

FIG. 6 shows a system similar to that of FIG. 5 in which separate P and S polarized beams 81A and 81B are introduced via reflectors 92 and 93. A separate combiner, preferably identical to that used in the embodiment of FIG. 5, is used to combine the beams reflected by polygons 27 and 28. While FIGS. 5 and 6 show scanners which use polarizing reflectors, which results in a high optical efficiency, in FIG. 6 elements 92 and 93 may be replaced by an ordinary semi-reflecting mirror, preferably a front surface mirror. Element 82 may be replaced by a half transparent mirror (beam splitter element) in either FIG. 5 or FIG. 6. For this embodiment the λ/4 plates may be omitted. While such embodiments are possible and do not require polarized beams, the efficiency of these non-polarizing options is generally lower than that of the polarizing versions.

The methodology or FIGS. 5 and 6, are especially useful since they provide completely symmetric optical paths for the two beams which minimizes F-θ aberrations.

Preferably the beam path lengths in the embodiments of FIGS. 5 and 6 should be the same so the beams have equal focus characteristics. Preferably, however, a shift compensator and a differential focus compensator as shown in FIG. 3 should preferably be inserted between the beam splitter and the polygon mirrors in the embodiments of FIGS. 5 and 6.

Similarly the other embodiments of the invention could utilize non-polarizing beam splitters with reduced efficiency.

It should be understood that the description hereinabove of the apparatus and method of increasing the useful duty cycle of scanners may be employed in combination with or separately from other features of the apparatus illustrated in the drawings and described herein. It is apparent that a number of improved scanner embodiments, within the scope of the invention, can be realized to satisfy the requirements described.

While in the forgoing embodiments of the invention, the angular shift between the polygons is 180°, which results in a symmetrical polygon set, it may be desirable, under certain circumstances, to use a different angle. For example, if each polygon has a lower duty cycle, the beams may be made to follow each other without any gap. This will cause a larger gap later on, but it will allow for a longer continuous scan. For example, if each polygon has a 35% duty cycle, the polygons can be configured such that the second polygon begins to scan just as the first one ends its scan. This will result in a continuous long scan having a 70% duty cycle.

The foregoing description discloses and describes merely exemplary embodiments of the present invention. Those skilled in the art will readily recognize from such description and claims together with the accompanying drawings that changes, modifications, and variations can be made without departing from the spirit and the scope of the invention as defined in the following claims.

In particular, the scanners of the present invention can be used to scan a photoreceptor with a data modulated beam to form an image thereon or can be used to scan a document being scanned (preferably moving either the document or the scanner in the cross-scan direction) with an unmodulated beam. The light reflected from the document is now detected by a photo-detector detector and a signal produced by the photo-detector is fed to a computer which generates a bit-map of the system based on the position of the beam on the document. Except for the beam scanner itself, the rest of the system can be completely conventional.

What is claimed is:

1. Apparatus for scanning a beam across a surface in a scan direction, comprising:

a plurality of multifaceted polygon disks, mounted for common rotation on an axis;

a beam generator that generates a plurality of independently data modulated beams;

a surface; and beam directing apparatus that directs the plurality of beams toward the polygon disks for reflection therefrom to the surface;

wherein the beam directing apparatus directs a first set of at least two of the beams to simultaneously impinge on a facet of one of said disks for reflection therefrom toward the surface and which directs a second set of at least two beams to simultaneously impinge on a facet of a different one of the disks to be reflected therefrom toward the surface.

2. Apparatus according to claim 1 wherein the at least two beams that simultaneously impinge a facet are offset from each other in the cross-scan direction.

3. Apparatus according to claim 2 wherein the at least two beams that simultaneously impinge a facet substantially simultaneously scan parallel lines on the surface.

4. Apparatus according to claim 1 wherein the beam directing apparatus includes a splitter which receives said plurality of beams and splits them to said first and second sets of beams.

5. Apparatus according to claim 4 wherein the splitter comprises a polarizing beam splitter such that at least some of the plurality of beams have different polarizations.

6. Apparatus according to claim 1 and including:
a combiner which receives the sets of beams reflected from the plurality of disks and redirects them such that corresponding beams of said sets sweep substantially the same line.

7. Apparatus according to claim 6 wherein the reflected beams are polarized beams and wherein the combiner comprises a polarizing beam combiner.

8. Apparatus according to claim 7 wherein the polarizing beam combiner includes a beam splitter configured to operate as a combiner.

9. Apparatus according to claim 1 and including:
optics operative to provide differential focusing between the sets of beams.

10. Apparatus according to claim 9 wherein the optics is operative to provide adjustable differential focusing between the sets of beams.

11. Apparatus according to claim 1 and including:
optics operative to provide differential offset between the sets of beams in the cross-scan direction.

12. Apparatus according to claim 11 wherein optics operative to provide differential offset between the sets of beams in the cross-scan direction provides adjustable offset between the beams in the cross-scan direction.

13. Apparatus according to claim 1 wherein the surface moves in the cross-scan direction.

14. Apparatus according to claim 1 wherein the multifaceted disks are mounted such that the facets of the respective disks have an angular shift between them.

15. Apparatus according to claim 14 wherein the angular shift is equal to 180°/N, where N is the number of facets on each disk.

16. Apparatus according to claim 1 wherein the plurality of multifaceted polygons consists of two such polygons.

17. Apparatus according to claim 1 wherein beams reflected from different ones of the disks sequentially scan the surface.

18. Apparatus according to claim 1 wherein the surface is scanned by at least one beam for more than 75% of the time.

19. Apparatus according to claim 1 wherein the surface is photosensitive surface.

20. Apparatus for scanning a beam across a surface in a scan direction, comprising:
a plurality of multifaced polygon disks, mounted for common rotation on an axis;
a beam generator that generates a plurality of independently data modulated beams;
a surface; and
beam directing apparatus that directs the plurality of beams toward the polygon disks for reflection therefrom to the surface,
wherein the beam directing apparatus directs a first set of at least two beams to simultaneously impinge on a facet of one of said disks for reflection therefrom toward the surface and which directs a second set of at least two beams to simultaneously impinge on a facet of a different one of the disks to be reflected therefrom toward the surface, and wherein the beam directing apparatus includes a splitter which receives said plurality of beams and splits them to said first and second set of beams.

21. Apparatus according to claim 20 wherein the splitter comprises a polarizing beam splitter such that at least some of the beams have different polarizations.

22. Apparatus according to claim 20, and including:
a combiner which receives the sets of beams reflected from the plurality of disks and redirects them such that corresponding beams of said sets sweep substantially the same line.

23. Apparatus according to claim 22 wherein the reflected beams are polarized beams and wherein the combiner comprises a polarizing beam splitter.

24. Apparatus according to claim 23 wherein the polarizing beam combiner includes a beam splitter configured to operate as a combiner.

25. Apparatus for scanning a beam across a surface in a scan direction, comprising:
a plurality of multifaced polygon disks, mounted for common rotation on an axis;
a beam generator that generates a plurality of independently data modulated beams;
a surface;
beam directing apparatus that directs the plurality of beams toward the polygon disks for reflection therefrom to the surface, and
a combiner which receives the sets of beams reflected from the plurality of disks and redirects them such that corresponding beams of said sets sweep substantially the same line,
wherein the beam directing apparatus directs a first set of at least two beams to simultaneously impinge on a facet of one of said disks for reflection therefrom toward the surface and which directs a second set of at least two beams to simultaneously impinge on a facet of a different one of the disks to be reflected therefrom toward the surface.

26. Apparatus according to claim 25 wherein the reflected beams are polarized beams and wherein the combiner comprises a polarizing beam splitter.

27. Apparatus according to claim 26 wherein the polarizing beam combiner includes a beam splitter configured to operate as a combiner.

* * * * *